United States Patent
Kimura et al.

(10) Patent No.: US 6,610,378 B1
(45) Date of Patent: *Aug. 26, 2003

(54) BIAXIALLY ORIENTED POLYESTER FILM TO BE FORMED INTO CONTAINERS

(75) Inventors: Masahiro Kimura, Otsu (JP); Kohzo Takahashi, Otsu (JP); Koichi Abe, Kyoto (JP)

(73) Assignee: Toray Industries, Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/724,352

(22) Filed: Oct. 1, 1996

(30) Foreign Application Priority Data

| Oct. 2, 1995 | (JP) | 7-255207 |
| Nov. 17, 1995 | (JP) | 7-300112 |
| Mar. 21, 1996 | (JP) | 8-064345 |
| Apr. 16, 1996 | (JP) | 8-093889 |

(51) Int. Cl.$^7$ .......................... B32B 7/00; B32B 15/08; B32B 27/08; B32B 27/36

(52) U.S. Cl. ................ 428/35.8; 428/35.7; 428/212; 428/213; 428/214; 428/215; 428/332; 428/339; 428/343; 428/346; 428/347; 428/457; 428/458; 428/480; 428/910; 528/308; 528/308.1; 528/308.6

(58) Field of Search .............. 428/35.8, 480, 428/483, 457, 458, 910, 35.7, 212, 213, 214, 215, 332, 339, 343, 346, 347; 528/308, 308.1, 308.6

(56) References Cited

U.S. PATENT DOCUMENTS

| 4,618,528 A | * | 10/1986 | Sacks et al. ................. 428/216 |
| 4,735,835 A | * | 4/1988 | Taira et al. ................... 428/35 |
| 5,112,695 A | * | 5/1992 | Watanabe et al. ........... 428/358 |
| 5,137,762 A | * | 8/1992 | Aizawa et al. ............. 428/35.8 |
| 5,179,854 A | * | 1/1993 | Matsui et al. ................. 72/349 |
| 5,240,779 A | * | 8/1993 | Ono et al. ................... 428/458 |
| 5,292,471 A | * | 3/1994 | Ito et al. ...................... 264/171 |
| 5,300,335 A | * | 4/1994 | Miyazawa et al. ......... 428/35.8 |
| 5,384,354 A | * | 1/1995 | Hasegawa et al. .......... 524/539 |
| 5,473,004 A | * | 12/1995 | Ono et al. ................... 524/425 |
| 5,591,518 A | * | 1/1997 | Sumiya et al. ........... 428/318.4 |
| 5,618,621 A | * | 4/1997 | Hasegawa et al. .......... 428/343 |
| 5,705,240 A | * | 1/1998 | Machii et al. ............. 428/35.9 |
| 5,753,377 A | * | 5/1998 | Takahashi et al. .......... 428/480 |
| 5,780,158 A | * | 7/1998 | Asai et al. ................... 428/412 |

FOREIGN PATENT DOCUMENTS

| JP | 03-073337 A | * | 3/1991 |
| JP | 7-238176 | * | 9/1995 |
| JP | 8-003334 | * | 1/1996 |

* cited by examiner

Primary Examiner—Vivian Chen
(74) Attorney, Agent, or Firm—Piper Rudnick LLP

(57) ABSTRACT

A biaxially oriented polyester film capable of lining the interior and/or exterior of a container, including a polyester containing about 93 mol % or more of ethylene terephthalate. The film has a breaking elongation in the machine direction. (S MD) and the breaking elongation in the transverse direction (S TD), satisfying the relationships 140%≦(S MD+S TD)/2≦300% and |S MD−S TD|≦60%. The film is capable of lining the interior and/or exterior of food containers, especially on the inner and outer faces of metallic cans, since the film exhibits excellent formability, impact resistance and taste properties.

29 Claims, No Drawings

BIAXIALLY ORIENTED POLYESTER FILM TO BE FORMED INTO CONTAINERS

TECHNICAL FIELD

The present invention relates to a polyester film having advantageous properties for formation into containers, which film has excellent formability, impact resistance and taste properties. In more detail, this invention relates to a biaxially oriented polyester film that is able to be suitably formed together with a metallic sheet into a metallic can.

BACKGROUND ART

Containers such as metallic cans are conventionally produced by forming, for example, by drawing and ironing a polyester film alone, or after laminating it on a substrate made of a metal or a nonmetallic material (paper, plastic material, fibrous material, or nonwoven fabric, etc.), etc.

Above all, the thermal lamination of a film on a metallic sheet has attracted attention for the production of metallic cans, and has grown recently.

It has been widely practiced, for the purpose of preventing corrosion, to internally coat metallic cans with a solution or dispersion of any of the various epoxy-based or phenol-based thermosetting resins. Such resins may be dissolved or dispersed in a suitable solvent, and are applied to cover the internal surface of the metal. However, a long time is needed for drying the coating material, decreases productivity and requires a large amount of an organic solvent, risking environmental pollution.

To solve these problems it has been proposed to laminate a polyester film on steel or aluminum sheets destined to become metallic cans. These metallic sheets may be surface treated by various methods such as plating, followed by drawing and ironing to produce metallic cans. In this case, the polyester film needs the following properties:

(1) Excellent formability, free of defects such as pinholes after forming.
(2) The polyester film should not peel, crack or become pinholed as a result of impact on the can.
(3) The polyester film should not adsorb or transmit any flavor component of the content of the metallic can. None of its components may be dissolved to impair the flavor of the can content.

Many proposals have been made to meet these requirements. For example, Japanese Patent Laid-Open (Kokai) No. 2-305827 discloses a polyester film with a specific face orientation coefficient; Japanese Patent Laid-open (Kokai) No. 2-57339, a copolymerized polyester film with specific crystallinity; and Japanese Patent Laid-Open (Kokai) No. 3-93525, a film made less oriented and less dense mainly by blending with a copolymer. However, these proposals fail to satisfy all the above-mentioned requirements, and do not provide good compatibility between formability and impact resistance, or good taste properties. Indeed, containers made by laminating an olefin-based polymer and a sheet of metal or paper, etc. have remarkably poor taste properties.

DISCLOSURE OF THE INVENTION

An important object of the present invention is to overcome the problems of the prior art, and to provide a biaxially oriented polyester film that is ideal for forming into containers, and has excellent formability, impact resistance and taste properties. Another important object is to provide a biaxially oriented polyester film that is ideally combinable with a metallic sheet for formation into a metallic can.

These and other objects of the present invention can be achieved by creating a biaxially oriented polyester film comprising a polyester containing about 93 mol % or more of ethylene terephthalate and having a breaking elongation in the machine direction (S MD) and a breaking elongation in the transverse direction (S TD), that satisfy the following Formula 1 and Formula 2. The invention further relates to a biaxially oriented polyester film able to be formed into containers, comprising a polyester containing about 93 mol % or more of ethylene terephthalate as one component, and having a face orientation coefficient in the range of about 0.01 to less than 0.13. It further relates to a biaxially oriented polyester film able to be formed into containers, comprising a polyester containing about 95 mol % or more of ethylene terephthalate as one component, and having an amorphous Young's modulus in the range of about 120 to 220 kg/mm$^2$. Formula 1 is as follows:

140%$\leq$(S MD+S TD)/2$\leq$300% The term S MD means breaking elongation in the machine direction. The term S TD means breaking elongation in the transverse direction Formula 2 is as follows:

$$|S\ MD-S\ TD|\leq 60\%$$

MOST PREFERRED EMBODIMENTS

The polyester of the present invention contains about 93 mol % of ethylene terephthalate. It is highly advantageous in view of its incapability of adsorbing flavor components of the contents of the container. It also has good heat resistance. The polyester may contain another copolymerized component so long as these advantageous properties are not impaired. The dicarboxylic acid comprising one component of the polyester can be selected, for example, from aromatic dicarboxylic acids such as naphthalenedicarboxylic acid, diphenyldicarboxylic acid, diphenylsulfonedicarboxylic acid, diphenoxyethanedicarboxylic acid, 5-sodiumsulfoisophthalic acid, and phthalic acid, aliphatic dicarboxylic acids such as oxalic acid, succinic acid, adipic acid, sebacic acid, dimer acid, maleic acid, and fumaric acid, alicyclic dicarboxylic acids such as cyclohexynedicarboxylic acid, hydroxycarboxylic acids such as p-hydroxybenzoic acid.

On the other hand, the glycol component can be selected, for example, from aliphatic glycols such as propanediol, butanediol, pentanediol, hexanediol, and neopentyl glycol, alicyclic glycols such as cyclohexanedimethanol, aromatic glycols such as bisphenol A, and bisphenol S, diethylene glycol, polyalkylene glycol, etc. Two or more of the above dicarboxylic acids and glycols can also be used together.

Moreover, so long as the objects of the present invention are not impaired, the polyester of the present invention can be copolymerized with a polyfunctional compound such as trimellitic acid, trimesic acid, or trimethylolpropane, etc. In the present invention, especially for applications involving severe taste restrictions, the ethylene terephthalate content is preferably about 95 mol % or more, more preferably about 97 mol % or more. Furthermore, in the present invention, in achieving improved impact resistance and taste properties, the intrinsic viscosity is preferably about 0.5 to 1.5. Especially for achieving higher impact resistance it is preferably about 0.7 to 1.5, more preferably about 0.81 to 1.5, and further more preferably about 0.83 to 1.5. A larger intrinsic viscosity is considered to increase the chance that molecules will be more intertwined, and as a result, will improve impact resistance and minimize flavor component adsorbability.

The intrinsic viscosity [η] can be determined by dissolving the polymer into o-chlorophenol, and measuring the relative viscosity at 25° C.

Moreover, to provide improved taste properties, the acetaldehyde content of the polyester film is preferably about 30 ppm or less, more preferably about 25 ppm or less, further more preferably about 20 ppm or less. An acetaldehyde content of more than about 30 ppm may deteriorate the taste properties. The method for keeping the acetaldehyde content of the film at about 30 ppm or less is not especially limited. For example, the polyester can be annealed under reduced pressure or in an inactive gas atmosphere at a temperature lower than the melting point of the polyester, to remove acetaldehyde produced by thermal decomposition during the production of the polyester by a polycondensation reaction, etc. As another method, the polyester can be polymerized in a solid phase preferably under reduced pressure or in an inactive gas atmosphere at a temperature higher than 150° C. and lower than the melting point. In still another method, the polyester can be melt-formed into a film using a vent type extruder. As yet another method, the polyester can be melt-extruded at a temperature of melting point+ about 30° C. or less, preferably melting point+ about 20° C. or less, more preferably melting point + about 15° C. or less in a short time. These methods are effective also for obtaining a film having a high intrinsic viscosity.

To obtain a film having a high intrinsic viscosity, it is preferable to keep the water content of the polyester chips at about 100 ppm or less, preferably about 50 ppm or less, further more preferably about 30 ppm or less.

Furthermore, to improve taste properties, the polyester film of the present invention contains preferably about 1 to 500 ppm, more preferably about 5 to 300 ppm, further more preferably about 10 to 100 ppm of germanium. If the germanium content is too low, the improvement in the taste property may be insufficient, and if too large, foreign matter may be generated in the polyester to lower its impact resistance and to deteriorate the taste properties. The polyester of the present invention can exhibit improved taste properties by containing said specific amount of germanium. The method for incorporating germanium in the polyester is not especially limited, but it is preferable to add a germanium compound as a polymerization catalyst at any point before the production of the polyester is completed. For example, a germanium compound can be added as a powder. As another method, as described in Japanese Patent Publication (Kokoku) No. 54-22234, a germanium compound can be dissolved into the glycol used as a starting raw material of the polyester. The germanium compound can be selected from, for example, germanium dioxide, germanium hydroxide containing crystal water, germanium alkoxide compounds such as germanium tetramethoxide, germanium tetraethoxide, germanium tetrabutoxide, and germanium ethyleneglycoxide, germanium phenoxide compounds such as germanium phenolate and germanium β-naphtholate, phosphorus-containing germanium compounds such as germanium phosphate and germanium phosphite, germanium acetate, etc. Among them, germanium dioxide is preferable. Furthermore, the number of carboxyl terminal groups in the polyester film of the present invention is preferably about 40 equivalents/ton or less in view of impact resistance and taste property. When the amount of the carboxyl terminal groups is about 35 equivalents/ton or less, the recoverability and impact resistance of the film are especially improved. It is preferable to decrease the carboxyl terminal groups of the raw polyester by (1) Solid phase polymerization, (2) using a known terminal blocking agent such as carbodiimide or oxazoline to a predetermined amount, and (3) extruding at a low temperature in a short time.

On the other hand, increasing the number of carboxyl terminal groups on the surface by a surface treatment, etc. is preferable for improving the adhesive strength.

The polyester film of the present invention is preferably about 0.8 wt % or less, more preferably about 0.7 wt % or less, further preferably about 0.6 wt % or less in the cyclic oligomer content of the polyester in view of taste property. If the oligomer content of the polyester is too large, the taste property may become poor. The method for keeping the oligomer content of the polyester film in this range is not especially limited. The oligomer content can be kept in this range, for example, by adopting any of the same methods as used for decreasing the acetaldehyde content of the polyester film.

To produce the polyester of the present invention, any conventional method can be adopted without limitation. For example, when polyethylene terephthalate is produced using germanium dioxide as the germanium compound, the following production method can be adopted. Terephthalic component and ethylene glycol are subjected to an ester interchange reaction or an esterification reaction, and germanium dioxide is added. In succession, a polycondensation reaction is effected at a high temperature under reduced pressure until a certain diethylene glycol content is reached, to obtain a germanium-containing polymer. In this case, direct polymerization in which any ester interchange catalyst such as a magnesium-containing compound or manganese-containing compound is not substantially used is preferable, since the taste property of the film can be good. The obtained polymer is then polymerized in a solid phase at a temperature lower than the melting point of the polymer under reduced pressure or in an inactive gas atmosphere, which lowers the acetaldehyde content and provides control over the intrinsic viscosity and the number of carboxyl terminal groups.

In the present invention, in view of heat resistance and taste property, it is necessary to biaxially stretch a polyester containing ethylene terephthalate as a main component. The biaxial stretching can be either simultaneous biaxial stretching or sequential biaxial stretching. The inventors studied intensively the stretching conditions of biaxially oriented film, and as a result, found that a biaxially oriented polyester film in which the breaking elongation in the machine direction (S MD) and the breaking elongation in the transverse direction (S TD) satisfy Formula 1, and Formula 2 possesses good formability and impact resistance. It was also discovered that a biaxially oriented polyester film to be formed into containers which contains about 93 mol % or more of ethylene terephthalate as a component and has a face orientation coefficient of about 0.01 to less than about 0.13 has a good lamination property and good formability. It was still further discovered that a biaxially oriented polyester film to be formed into containers which contains about 95 mol % or more of ethylene terephthalate as a component and has an amorphous Young's modulus of about 120 to about 220 kg/mm$^2$ possesses good high speed formability.

Formula 1 about 140% ≦ (S MD+S TD)/2 ≦ about 300%

S MD: Breaking elongation in the machine direction

S TD: Breaking elongation in the transverse direction

Formula 2

|S MD−S TD| ≦ about 60%

In the above formulae, the breaking elongation (%) is measured by pulling a sample of 10 mm in width and 50 mm in length at a tensile speed of 300 mm/min in 25° C. 65% humidity atmosphere using a Tensilon tensile tester.

The amorphous Young's modulus refers to the value calculated from the following formula, being the average of the values measured in the machine direction and in the transverse direction.

Ea=(1−φ)Ef
Ea: Amorphous Young's modulus
φ: Crystallinity
Ef: Young's modulus of film
φ=(ρ−1.335)/0.12
ρ: Density measured by density gradient tube Furthermore, in view of formability and impact resistance, the average ((S MD+S TD)/2) of the breaking elongation in the machine direction (S MD) and the breaking elongation in the transverse direction (S TD) is preferably about 160% to about 300% more preferably about 180% to about 280%.

In view of better formability at the upper part of the can, the difference in absolute value between the breaking elongation in the machine direction (S MD) and the breaking elongation in the transverse direction (S TD) is preferably about 0% to about 50%, more preferably about 0% to about 40%. This range of difference can be achieved by properly controlling the temperature, speed and ratio of longitudinal stretching and the temperature, speed and ratio of lateral stretching when the film is formed, or furthermore the preheating conditions before respective stretching, and annealing conditions.

Moreover, in a tensile test at 75° C., the stress at an elongation of 100% is preferably about 12 kg/mm² or less, more preferably about 11 kg/mm² or less in the machine direction or transverse direction, in view of better formability. This range of stress can be achieved by properly controlling the temperature, speed and ratio of stretching when the film is formed.

In the present invention, for better lamination property and formability, the face orientation coefficient is preferably in the above-mentioned range, and especially in view of the lamination property, the face orientation coefficient is preferably about 0.02 to about 0.125, more preferably about 0.02 to about 0.12. This range of face orientation coefficient can be achieved by properly controlling the temperature, speed and ratio of longitudinal stretching and the temperature, speed and ratio of lateral stretching when the film is formed, or by controlling the preheating conditions before stretching, or by controlling the annealing conditions. The density in this case is preferably about 1.385 g/cm³ to about 1.42 g/cm³, more preferably about 1.39 g/cm³ to about 1.42 g/cm³ in view of formability.

The face orientation coefficient in this specification means fn=(Nx+Ny)/2−Nz, where Nx, Ny and Nz are refractive indexes in the machine direction, transverse direction and thickness direction respectively.

In the present invention, in view of better high speed formability, the amorphous Young's modulus is preferably in the above-mentioned range, more preferably about 120 to about 200 kg/mm², and most preferably about 120 to about 180 kg/mm². This range of amorphous Young's modulus can be achieved by properly controlling the temperature, speed and ratio of longitudinal stretching and the temperature, speed and ratio of lateral stretching when the film is formed, or by controlling the preheating conditions before stretching, or by controlling annealing conditions. Preferably, it can be achieved by annealing under high temperature or stretching at a low ratio. Furthermore, in the present invention, the relaxation time T1ρ of 1,4 benzene ring carbon atoms in the structural analysis by solid NMR is preferably about 150 msec or more, more preferably about 180 msec or more, further more preferably about 200 msec to about 600 msec in view of better lamination property and impact resistance.

If the relaxation time T1ρ is not in this range, not only lamination property but also impact resistance, particularly the storage stability of impact resistance may be lowered. The relaxation time T1ρ expresses molecular mobility, and a higher T1ρ value means lower mobility. This means that the T1ρ of benzene ring carbon atoms at 1,4 positions is preferably about 150 msec or more in the biaxially oriented film, and this controls the molecular constraint in this region to inhibit the orientation at the time of lamination and to manifest excellent impact resistance. A relaxation time T1ρ of about 150 msec or more can be achieved by applying any method to enforce molecular constraint when the film is formed, for later biaxial stretching.

Furthermore, the relaxation time T1ρ of carbonyl carbon atom in the structural analysis by solid high resolution NMR is preferably about 250 msec or more, more preferably about 300 msec to about 900 msec in view of further improving impact resistance. The relaxation time in this range can be achieved by applying any method to enforce molecular constraint when the film is formed, for subsequent biaxial stretching.

In the present invention, the grain size of the (100) face obtained by X-ray diffractometry is preferably about 6 nm or less, more preferably about 5.5 nm to about 2 nm, further more preferably about 2.5nm to about 5 nm or less, particularly preferably about 4.5 to about 3 nm in view of controlling crystal melting at the time of lamination. Moreover, in the present invention, formation as a laminated film is preferable, and it is desirable that the film consist of at least two or more layers, and that the difference in intrinsic viscosity between "the layer (I) on the side opposite to the side which will contact the content of the container" and "the layer (II) in contact with said layer" is about 0.01 to about 0.5, in view of especially better formability and impact resistance. When impact resistance is especially important, the layer (I) to be laminated on the metallic sheet preferably has a higher intrinsic viscosity.

Furthermore, in the present invention, the thermal crystallization parameter ΔTcg of the polyester with ethylene terephthalate as a main component preferably satisfies Formula 3, is more preferably about 70° C. to about 130° C., further more preferably about 80° C. to 130° C., in view of crystallization control after completion of annealing during can production, higher impact resistance, and higher formability in forming the laminated metallic sheet after completion of annealing. The thermal crystallization parameter in this range can be achieved by controlling the catalyst, molecular weight, and by-production and addition of diethylene glycol.

Formula 3 is as follows:
about 60 (° C.)≦ΔTcg≦about 150 (° C.)
ΔTcg=Tc−Tg
Tc: Heated crystallization peak temperature in DSC (° C.)
Tg: Glass transition temperature in DSC (° C.)

Furthermore, in the present invention, a film with an about 0.01 to about 3 μm thick adhesive layer laminated on the polyester film is preferable in view of an especially high formability ratio, boiling heat resistance and good corrosion resistance. The adhesive layer can be made of any polymer which can be either a thermoplastic resin or thermosetting resin. Preferable polymers include epoxy resins, amide resins, acrylic resins, polyester resins, urethane resins, phenol resins, amino resins, their mixtures and copolymer resins, etc. In addition, a hardening catalyst, and a crosslinking agent such as a melamine compound or epoxy compound can also be mixed.

In the present invention, as described above, the film can be formed into containers, but in addition, the film can be laminated onto, for example, a paper sheet, plastic sheet, fibrous sheet, nonwoven fabric or metallic sheet, etc., to be formed into containers, since the film possesses excellent formability, adhesive strength, impact resistance and taste property.

The film performs particularly well when laminated onto a metallic sheet for container production, since a film as thin as about 30 μm or less can be used and since the taste property and barrier formation are excellent.

Furthermore, when a laminated metallic sheet with a metallic sheet as the substrate is formed by drawing or ironing, etc. for subsequent production of metallic cans, the metallic cans can be used either as negative pressure cans or positive pressure cans since the substrate is made of metal. Especially when the substrate on which the film is laminated is a steel sheet, aluminum sheet or their surface treated sheets thereof, it facilitates forming and is excellent in impact resistance when in can form.

To most effectively form the film of the present invention into high performance containers, it is preferable to draw the laminated metallic sheet in one step or in few steps. The metal can be preferably selected from, though not limited to, metals mainly composed of iron or aluminum, etc. in view of formability. Especially in the case of an iron-based metallic sheet, its surface can be covered with an inorganic oxide layer, for example, a chemical conversion layer applied by chromic acid treatment, phosphate treatment, chromic acid/phosphate treatment, electrolytic chromic acid treatment, chromate treatment, chromium chromate treatment, etc., to improve adhesive strength and corrosion resistance. It is especially preferable to coat with chromium oxide hydrate by applying about 6.5 to about 150 mg/m$^2$ as chromium metal. Furthermore, a plating layer of a malleable metal such as nickel, tin, zinc, aluminum, gun metal or brass, etc. can also be provided. In the case of tin plating, the plating quantity is preferably about 0.5 to about 15 g/m$^2$, and in the case of nickel or aluminum, the plating quantity is preferably about 1.8 to about 20 g/m$^2$.

If the biaxially oriented polyester film of the present invention has an adhesive strength to the metallic sheet of about 1 kg/15 mm or more, it can withstand the forming by ironing or drawing, etc. and is especially good in impact resistance, with the impact resistance having excellent storage stability. The adhesive strength is more preferably about 1.2 kg/15 mm to about 6 kg/15 mm. The method for enhancing the adhesive strength is not especially limited. The adhesive strength can be enhanced, for example, by controlling the crystallinity of the polyester, increasing the molecular weight, intensifying the surface activation treatment, or providing an adhesive layer, etc., and two or more of these methods can be combined.

Moreover, in the present invention, if the adhesive strength to the metallic sheet after ironing or drawing, or after annealing subsequent to ironing or drawing, is about 250 g/15 mm or more, the formability at the upper part of the metallic can (i.e., the neck) is improved, and the corrosion resistance after boiling treatment and the storage stability of corrosion resistance are improved.

The adhesive strength is more preferably about 400 g/15 or more, further more preferably about 600 g/15 mm or more, most preferably about 800 g/15 mm or more. The method for enhancing the adhesive strength is not especially limited. The adhesive strength can be enhanced, for example, by controlling the crystallinity, orientation and molecular mobility of the polyester, increasing the molecular weight, intensifying the surface activation treatment, or providing an adhesive layer. Any one or more of these methods can be employed. The thickness of the polyester film of the present invention is preferably about 5 to about 50 μm, more preferably about 8 to about 45 μm, and most preferably about 10 to about 40 μm, in view of the formability of the laminated metallic sheet, film formability on the metal, impact resistance and taste property.

The polyester film of the present invention preferably has an average roughness Ra on at least one side of the film of about 0.001 to about 1 μm, more preferably about 0.005 to about 0.5 μm, and most preferably 0.01 to 0.1 μm so as to provide handling convenience and high speed lamination capability. Furthermore, the ratio Rt/Ra of maximum roughness Rt to average roughness Ra is preferably about 3 to about 40, more preferably about 5 to about 30, and most preferably about 5 to about 20, to protect against defects such as pinholes in the film and to provide excellent high speed lamination capability. Moreover, to obtain the polyester film with the surface properties described above, it is preferable that inorganic and/or organic grains of about 0.01 to about 10 μm in average grain size are present in the range of about 0.001 to about 10 wt %. To prevent detachment of grains from the film, it is preferable that inorganic grains and/or organic grains of about 0.1 to about 5 μm in average grain size are present in the range of about 0.005 to about 3 wt %. The inorganic grains and/or organic grains can be inorganic grains of, for example, wet or dry silica, colloidal silica, titanium oxide, calcium carbonate, calcium phosphate, barium sulfate, alumina, mica, kaolin, clay or aluminum silicate, and organic grains composed of styrene, divinylbenzene, silicone, acrylic acid, polyester, etc. Among them, inorganic grains of silica, calcium carbonate, aluminum silicate, etc. and organic grains composed of styrene, silicone, acrylic-acid, methacrylic acid, polyester or divinylbenzene, etc. can be preferably used. Two or more kinds of these inorganic grains and/or organic grains can also be used together.

Using grains larger than about 10 μm in average grain size can lead to defects in the film. When grains having an average grain size of about 20 μm or more are present, the properties of the film are greatly deteriorated. When the film is formed, it is preferable to use a filter which can substantially eliminate grains having an average grain size of about 20 μm or more.

The average grain size of grains in this specification is calculated according to the following method. From the surface of the film, the polymer is removed by a plasma low temperature incineration treatment to expose the grains. The grains are observed with a scanning electron microscope (SEM), and the image of the grains is processed by an image analyzer. Several areas of the film are evaluated, and more than 5,000 grains are numerically processed. The number average diameter D is then calculated using the following formula, and is adapted as the average grain size.

$D=\Sigma Di/N$ where Di is the circle equivalent diameter of each grain, and N is the number of grains.

Furthermore, to prevent the film from having defects caused by the detachment of grains during formation, internal grains can be precipitated during polyester polymerization to produce protrusions on the surface of the film.

The method for precipitating internal grains is not especially limited. For example, a mixture containing an alkali metal compound or alkaline earth metal compound as an ester interchange catalyst can be polymerized according to conventional means to precipitate grains in the reaction mixture. As another method, terephthalic acid, for example, can be added during the ester interchange reaction or polycondensation reaction. In still another method, an alkali metal compound or alkaline earth metal compound can be arranged to exist before or after completion of the esterification reaction, and the polycondensation reaction can be effected in the presence of a phosphorus compound for precipitation. It is especially desirable in view of uniformity of grain size that the ratio (B+0.5A)/P is about 0.5 to about 5, where A is the number of moles of the alkali metal compound, B is the number of moles of the alkaline earth metal compound and P is the number of moles of the phosphorus compound.

The content of the internal grains is preferably about 0.01 to about 2 wt %, and can be obtained, for example, according to the following method.

Three hundred grams of o-chlorophenol is added to 30 g of a polyester sample, and while the mixture is stirred the polymer is dissolved at 100° C. in 1 hour. Then, an ultracentrifuge Model 40P produced by Hitachi, Ltd. is mounted with a rotor RP30, and 30 cc of the solution is injected into each cell. The ultracentrifuge is gradually rotated to reach 30,000 rpm, and one hour later, the separation of grains is complete. Furthermore, the supernatant solution is removed, and the separated grains are taken. To the grains, o-chlorophenol of room temperature is added, for homogeneous suspension, and the suspension is ultracentrifuged, and this is repeated until the melt peak of the polymer by DSC does not appear any more. The separated grains thusly obtained are dried in vacuum at 120° C. for 16 hours, and weighed (in this case, if a catalyst, inorganic grains, organic grains, etc. are contained, the weights of the catalyst, inorganic grains, organic grains, etc. should be differently identified). The internal grains can also be used together with other inorganic grains and/or organic grains.

In the case of a laminated film, the grains can be contained in any of the layers, but especially in view of impact resistance and handling convenience, it is preferable that the grains are added into a layer not laminated on the metallic sheet. The ratio D/d of the average grain size D ($\mu$m) to the thickness d ($\mu$m) of the layer is preferably about 0.05 to about 50, more preferably about 0.1 to about 10, and in view of better slipperiness, the ratio is most preferably about 0.5 to about 5.

When a layer not containing grains is formed for better impact resistance, it is preferable that the layer laminated on the metallic sheet does not substantially contain any grains. In the present invention, it is preferable that the wet tension on at least one side of the film is about 45 dyne/cm or more, more preferably about 48 dyne/cm or more, and most preferably about 50 dyne/cm or more in view of better formability and impact resistance.

The wet tension at least on one side of the film can be increased to about 45 dyne/cm or more, for example, by any conventional method such as corona treatment, chemical treatment, flame treatment or plasma treatment, etc. Among them, corona treatment of surface is preferable as a method for enhancing impact resistance. As for the corona treatment, when a region of a powerful electric field locally exists as in the case where a high voltage is applied to an electric wire, discharge localized in the region occurs, and this is called corona discharge. Exposing the film to the discharge for surface treatment is called corona treatment. The corona treatment can also be effected in air, nitrogen or carbonic acid gas, and for example, the corona treatment as proposed in Japanese Patent Laid-Open (Kokai) No. 1-20236, Japanese Patent Publication (Kokai) No. 57-30854, etc. can be preferably used. The intensity of the corona treatment is expressed in terms of the E value.

The E value is calculated using the formula W/(D•V), where W is the treatment intensity (W), D is the treatment width (m) and V is the film speed (m/min). The E value is preferably about 10 to about 60, more preferably about 15 to about 50 in view of higher wet tension and freedom from surface defects. If the treatment is effected at a temperature lower than the glass transition point of the polymer, the wet tension of the surface can be effectively increased. It is preferable to apply the surface treatment on the side to be laminated on the metallic sheet.

Moreover, in the present invention, to improve the impact resistance after application of a heat history of higher than 200° C. to the film and the impact resistance after application of about 100° C. water treatment (boiling treatment) to the film, an antioxidant is contained preferably in the range of about 0.005 to about 1 wt %, more preferably about 0.005 to about 0.5 wt %.

The antioxidant used is not especially limited, and can be preferably selected from conventional antioxidants including hindered phenols, hydrazines, phosphites, etc. Among them, pentaerythrityl-tetrakis[3-(3,5-di-t-butyl-4-hydroxyphenyl)propionate], 3,5-di-t-butyl-4-hydroxybenzylphosphonate-diethyl ester, 1,3,5-trimethyl-2,4,6-tris(3, 5-di-t-butyl-4-hydroxybenzyl)benzene, tris(2,4-di-t-butylphenyl)phosphite, etc. can be preferably used. In view of taste property, it is preferable that the layer in contact with the content of the container does not contain any antioxidant, but the layer laminated on the metallic sheet may still contain an antioxidant.

In the present invention, when the film is in contact with content of the container and another film is laminated on the other side of the metallic sheet, the latter film is preferably a biaxially oriented polyester film of about 0.3 to about 1, more preferably about 0.3 to about 0.9, most preferably about 0.5 to about 0.9 in optical density in view of printability. Furthermore, theglossiness is preferably about 50% or more, more preferably about 60% or more, most preferably about 70% to about 110%, in view of excellent printability and wear resistance.

To obtain such a film, not only the above-mentioned grains, particularly titanium oxide or calcium carbonate, but also known grains with high hiding power can be used. To incorporate the grains into the film, any known dispersing agent or grain surface treating agent can also be used.

The film of the present invention is especially preferably a laminated film. A layer containing about 2 to about 10 wt % of grains can be laminated on the side not laminated on the metallic sheet (A/B), or another layer similar to said layer can also be laminated on the side to be laminated on the metallic sheet, to form a laminate of A/B/A, etc. In this case, layer B preferably possesses a greater grain content than layer A.

The polyester film of the present invention can be made by any conventional method. An illustrative process for producing the film of the present invention is described below, but the present invention is not limited thereto.

The polyester is dried as required, fed into a conventional melt extruder, extruded as a sheet from a slit die, and brought into contact with a casting drum having static electricity applied thereto, etc., to be cooled and solidified to form a cast sheet. For stretching, either simultaneous biaxial stretching or sequential biaxial stretching can be used. The cast sheet is stretched in the machine direction and in the transverse direction, and annealed, to obtain a film with a desired face orientation. In view of film quality, it is preferable that a tenter oven be used, and sequential biaxial stretching consisting of longitudinal stretching followed by lateral stretching or substantially simultaneous biaxial stretching is desirable. The stretching ratios in the respective directions are about 1.5 to about 4.0 times, preferably about 1.8 to about 4.0 times. Either of the stretching ratios in the machine direction and the transverse direction can be larger, and they can also be equal. The stretching speed is preferably about 1,000%/min to about 200,000%/min. The stretching temperature is any temperature higher than the glass transition temperature of the. polyester and lower than the glass transition temperature+ about 80° C., usually preferably about 80 to about 150° C. After completion of biaxial stretching, the film is annealed, and the annealing can be effected by any conventional method in an oven or on a heated roll. The annealing temperature can be any temperature higher than about 120° C. and lower than the melting point, preferably about 120 to about 245° C. The annealing time is optional, but is preferably about 1 to about 60 seconds. The annealing can be effected with the film relaxed in the machine direction and/or in the transverse direction. Furthermore, re-stretching can be effected once or more in each direction, and can also be followed by annealing. When a laminated film is produced, the polymer can also be co-extruded in layers before the die, or can also be melt-extruded for lamination after casting and before or after stretching.

Furthermore, when the polyester film of the present invention is produced, as required, additives such as antioxidant, plasticizer, antistatic agent, weather resisting agent, terminal blocking agent, etc. can also be used. The methods for measuring and evaluating properties in the present invention are described below.

(1) Diethylene Glycol Content of Polyester

Measured according to NMR ($^{13}$C-NMR spectrum).

(2) Melting Point of Polyester

The crystallized polyester chips or film was measured by a differential scanning calorimeter (Model DSC-2 produced by Parkin Elmer) at a heating rate of 10C/min.

(3) Intrinsic Viscosity of Polyester

The polymer was dissolved into o-chlorophenol, and the relative viscosity was measured at 25° C., to obtain the intrinsic viscosity.

In the case of laminated film, the intrinsic viscosity of each layer of the laminated film was measured by scraping off the layer from the surface of the film using a knife (the layer remaining after scraping can also be washed by a solvent such as o-chlorophenol, and measured).

(4) Germanium Content of Polyester

Determined from the calibration curve between the germanium content of the polyester composition and the peak intensity obtained by fluorescent X-ray measurement.

(5) Acetaldehyde Content

Two grams of the polyester film as a fine powder was placed in a pressure vessel together with ion exchange water, and extracted with water at 120° C. for 60 minutes as part of a highly sensitive gas chromatography procedure.

(6) Amount of Carboxyl Terminal Groups (Equivalents/ton)

A polyester was dissolved in o-cresol/chloroform (7/3 by weight) at 90 to 100° C. for 20 minutes, then potentiometric titration was effected by an alkali.

(7) Oligomer Content

One hundred milligrams of the polyester film was dissolved into 1 ml of ortho-chlorophenol, and the cyclic trimer was measured by liquid chromatography (Model 8500 produced by Varian).

(8) Average Grain Size

From the surface of the film, the plastic resin was removed by plasma low temperature incineration, to expose the grains. The treatment conditions were selected to incinerate the thermoplastic resin, but not to damage the grains. The grains were observed by a scanning electron microscope (SEM), and the image of the grains was processed by an image analyzer. The observation was made at different places, and more than 5,000 grains were numerically processed, to obtain the number average grain size.

$$D=\Sigma Di/N$$

where Di is a circle equivalent diameter of each grain, and N is the number of grains.

In the case of internal grains, a section of a film slice can also be observed by a transmission electron microscope.

(9) Amorphous Young's Modulus and Breaking Elongation (%) of Film

A sample of 10 mm in width and 50 mm in length was pulled at a tensile speed of 300 mm/min using a Tensilon tensile tester, to measure the Young's moduli and breaking elongations (%) in the machine and transverse directions of the film at room temperature according to ASTM-3-882-81 (Method A).

The amorphous Young's modulus in this specification refers to the value calculated from the following formula, being the average of the values measured in the machine and transverse directions.

$$Ea=(1-\phi)Ef$$

Ea: Amorphous Young's modulus

φ: Crystallinity

Ef: Young's modulus of film

φ=(ρ−1.335)/0.12

ρ: Density

The density was obtained according to the density gradient method in water-potassium iodide aqueous solutions.

A tensile test at 75° C. was also effected, to obtain the stress at an elongation of 100%.

(10) Face Orientation Coefficient and Refractive Indexes

The refractive indexes (Nx, Ny and Nz) in the machine direction, transverse direction and thickness direction were measured, with sodium D ray (589 nm in wavelength) as the light source, using an Abbels refractometer, and the face orientation coefficient was obtained from fn=(Nx+Ny)/2−Nz.

(11) Surface Roughness of Film (Average Roughness: Ra, Maximum Roughness: Rt)

The surface roughness was measured using a surface roughness tester. Measuring conditions were as follows, and the average of twenty measured values was adopted. The surface roughness tester used was a high precision thin film level difference tester ET-10 produced by Kosaka Kenkyujo.

Tip diameter of probe: 0.5 μm

Probe load: 5 mg

Measuring length: 1 mm

Cutoff: 0.08 mm

Probe speed: 4 μm/sec.

The definitions of Rt and Ra are, for example, described in Jiro Nara, "Methods for measuring and evaluating surface roughnesses (in Japanese)"(General Engineering Center, 1983)

(12) Relaxation Time T1ρ

The solid NMR measuring instruments used were Spectrometer JNM-GX270, solid amplifier, MAS controller NM-GSH27MU and Probe NM-GSH27T VT W respectively produced by Nippon Denshi. The T1ρ (longitudinal relaxation in rotational coordinates) of $^{13}$C nucleus was measured.

Measurement was effected at 24.5° C. at 50% RH in a static magnetic field of 6.34 T (teslas). The resonance frequencies of $^1H$ and $^{13}C$ are 270.2 MHz and 67.9 MHz respectively. To eliminate the influence of anisotropy of chemical shift, MAS (magic angle rotation) method was adopted. The rotational frequency was 3.5 to 3.7 kHz. The pulse series conditions were 90° against $^1H$, 4 μm sec in pulse width and 62.5 kHz in rocking field intensity. The contact time for cross polarization from $^1H$ to $^{13}C$ was 1.5 msec. The retention time τ was set at 0.001, 0.5, 0.7, 1, 3, 7, 10, 20, 30, 40 and 50 msec. After lapse of retention time τ, the free induction damping (FID) of magnetization vector of $^{13}C$ was measured (high output decoupling was effected to eliminate the influence of dipole interaction by $^1H$ during FID measurement; and to improve the S/N ratio, calculation was effected 512 times). The pulse repetition time was in a range from 5 sec to 15 sec.

T1ρ value can be usually expressed by $$T1\rho = \Sigma(Ai)\exp(-t/T1\rho i)$$

(Ai: Rate of the component to T1ρi). The peak intensities observed for respective retention times were plotted on semilogarithmic graph paper, and the T1ρ value was obtained from the gradient. In this specification, analysis was made in a two-component system (T1ρ1: amorphous component, T1ρ2: crystalline component), and the following formula was used to obtain the value by least square fitting.

$$T1\rho = fa1 \cdot \exp(-t/T1\rho1) + fa2 \cdot \exp(-t/T1\rho2)$$

fa1: Rate of the component to T1ρ1
fa2: Rate of the component to T1ρ2
fa1+fa2=1

(13) Grain Size x

The grain size x of the (100) face was obtained by reflection X-ray diffraction using Scherrer's formula. The measuring X-ray wavelength was 0.15418 nm, and the diffraction of the (100) face was observed at a Bragg angle of about 12.7°.

(14) Thermal Crystallization Parameter of Polyester

The polyester was dried, molten, and quickly cooled, and the thermal crystallization parameter was measured by a differential scanning calorimeter (Model SC-2 produced by Parkin Elmer) at a heating rate of 16° C./min.

(15) Antioxidant Content

The film was dissolved into hexafluoroisopropanol, and acetonitrile was added to precipitate the polyester. The liquid was moderately concentrated and liquid chromatography was performed to determine the antioxidant content.

(16) Wet Tension of Film Surface

Measured according to JIS K 6768. As the standard solution, the following three series were used, depending on the magnitude of surface tension. 30 dyne/cm<γ<56 dyne/cm: JIS K 6768 standard solution 56 dyne/cm<γ<72 dyne/cm: ammonia water 72 dyne/cm<γ: sodium hydroxide aqueous solution

(17) Adhesive Strength

The adhesive strength of the film-laminated metallic sheet was obtained by a peeling test at an angle of 180°, and an average of ten measurements was calculated. Similar measurements were taken for the formed can.

(18) Lamination Property

A tin-free steel sheet was heated to 280° C. and laminated with the film. The laminated metallic sheet was quickly cooled, to measure the face orientation coefficient of the film laminated on the metallic sheet. This measurement was effected with ten samples, and the difference between the maximum and minimum values of the measured face orientation coefficient values was referred to for evaluation of lamination property according to the following criterion.

| Grade A | Less than 0.05 |
| Grade B | 0.005 to less than 0.01 |
| Grade C | 0.01 to less than 0.02 |
| Grade D | 0.02 or more |

(19) Formability a. Before Annealing

The film and a TFS sheet (0.25 mm thick) heated to 140–250° C. were laminated at 50 m/min to have the layer B as the adhesive side, quickly cooled, and formed by a drawing machine (drawing ratio (maximum thickness/minimum thickness)=2.0, drawn in a drawable temperature range from 80 to 100° C.), to obtain cans. Into each can, 1 wt % sodium chloride aqueous solution was poured, and allowed to stand for one day, and a voltage of 6 V was applied between an electrode in the sodium chloride aqueous solution and the metallic can, and the current value 3 seconds later was measured. The average of ten cans was obtained.

| Grade A | Less than 0.001 mA |
| Grade B | 0.001 mA to less than 0.01 mA |
| Grade C | 0.01 mA to less than 0.05 mA |
| Grade D | 0.05 mA or more | b. After Annealing

The above laminated steel sheet was annealed at 200° C. for 30 seconds, and drawn to 130% by a drawing machine, to obtain cans. Similarly, 1% sodium chloride aqueous solution was poured into each can, and allowed to stand for one day. A voltage of 6 V was applied between an electrode in the sodium chloride aqueous solution and the metallic can, and the current value 3 seconds later was measured. The average of ten cans was obtained.

| Grade A | Less than 0.005 mA |
| Grade B | 0.005 mA to less than 0.01 mA |
| Grade C | 0.01 mA to less than 0.05 mA |
| Grade D | 0.05 mA or more | c. After Boiling

The cans of the above b were worked at the necks, filled with water, sealed and annealed at 100° C. for 40 minutes.

They were opened, and 1 wt % sodium chloride aqueous solution was poured into each can, and allowed to stand for one day. A voltage of 6 V was applied between an electrode in the sodium chloride aqueous solution and the metallic can, and the current value 3 seconds later was measured. The average of ten cans was obtained.

| Grade A | Less than 0.005 mA |
| Grade B | 0.005 mA to less than 0.01 mA |
| Grade C | 0.01 mA to less than 0.05 mA |
| Grade D | 0.05 mA or more |

(20) Impact Resistance a. Can Bottom

Formed cans were annealed at 200° C. for 30 seconds, filled with 350 g of water, covered, allowed to stand at 30° C. for 72 hours, and dropped from a height of 30 cm onto concrete ground, so that the bottom face of each can might form an angle of 45° against the ground. The water was removed, and the cans were masked with wax on the inside surfaces. Then, 1 wt % sodium chloride aqueous solution was poured into each can, and allowed to stand for one day. A voltage of 6 V was applied between an electrode in the sodium chloride aqueous solution and the metallic can, and the current value 3 seconds later was measured. The average of ten cans was obtained.

| | |
|---|---|
| Grade A | Less than 0.3 mA |
| Grade B | 0.3 mA to less than 0.5 mA |
| Grade C | 0.5 mA to less than 1.0 mA |
| Grade D | 1.0 mA or more | b. Storage Stability of Impact Resistance

The cans described above a were allowed to stand for 7 days, then the impact resistance was measured as described above.

(21) Taste Property (a) The polyester film was allowed to stand at 40° C. for 14 days in contact with a flavor aqueous solution (30 ppm d-limonene aqueous solution) (500 cm² in contact area), and heated at the glass transition temperature of the thermoplastic resin A+5°C. for 30 minutes in nitrogen current, and the component expelled was analyzed by gas chromatography to determine the amount of d-limonene adsorbed per 1 g of the film.

(b) The laminated steel sheet was pressurized at 100° IC for 40 minutes in contact with water (1500 ml of distilled water for 2400 cm²). The extract was concentrated, and the total organic carbon (TOC) was measured by a TOC meter.

The present invention is described below in reference to illustrative examples. The examples are not intended to limit the scope of the appended claims.

EXPERIMENTAL EXAMPLE 1

An ethylene glycol slurry containing colloidal silica grains of various average grain sizes was annealed at 190° C. for 2 hours. Then, the slurry was added to the esterified reaction mixture, and the mixture was polycondensed to produce chips of polyethylene terephthalate (PET) containing said grains by predetermined amounts (using germanium dioxide as a catalyst (Ge: 40 ppm) and phosphoric acid as a thermostabilizer, intrinsic viscosity 0.71, diethylene glycol 3 mol %, ΔTcg=82° C.). This polyester was dried in vacuum at 170° C. for 4 hours, fed into a single screw extruder, discharged from a die, and cooled and solidified on a cooling drum with mirror-finished surface, while static electricity was applied (7 kV), to obtain a cast film (drum rotating speed 30 m/min). The cast film was stretched to 2.9 times at 110° C. in the machine direction (stretching speed 16300%/min), cooled to 40° C., preheated to 115° C. for 3 seconds, stretched to 2.9 times at 118° C. in the transverse direction (stretching speed 2000%/min), annealed at 190° C. with 5% relaxation for 5 seconds, and corona-treated in carbonic acid gas atmosphere. The film had 33 equivalents/ton of carboxyl terminal groups, 12 ppm of acetaldehyde, and 0.45 wt % oligomer. The properties of the film obtained and the properties of cans are shown in Tables 1 and 8. It can be seen that the elongation, face orientation coefficient and amorphous Young's modulus were well controlled, and good formability, impact resistance and taste property were obtained.

EXPERIMENTAL EXAMPLES 2 to 14

Films shown in Tables 1 to 5 were produced as in Experimental Example 1, except that the polyester production method, film forming method, lamination and polyester used were changed. The results are shown in Table 8.

Experimental Examples 2 to 9 used single-layer films, and were different in the polyester used and the film forming conditions. The physical properties of the films are shown in Tables 1 to 3. In Experimental Example 2, the polyester contained 0.05 wt % of (pentaerythrityl-tetrakis[3-(3,5-di-t-butyl-4-hydroxyphenyl)propionate]) as an antioxidant, and longitudinal stretching was effected at 108° C. at a ratio of 3.2 times, while lateral stretching was effected at a ratio of 3.2 times. The annealing temperature was 225° C. As a result, even though the face orientation coefficient was high, the elongation and amorphous Young's modulus were well controlled. Though the lamination property declined slightly, other properties were good.

In Experimental Example 3, PET having a catalyst-induced change in the crystallization rate was melt-extruded, cast, longitudinally stretched at 108° C. at a ratio of 2.9 times, preheated at 118° C. for 5 seconds, laterally stretched at 118° C. at a ratio of 3.0 times, and annealed at 220° C. As a result, due to poor elongation balance and low adhesive strength after forming, the formability and impact resistance storage stability were low.

In Experimental Example 4, PET having a catalyst-induced change in the crystallization rate and containing organic grains was melt-extruded, cast, longitudinally stretched at 108° C. at a ratio of 3.0 times, preheated at 118° C. for 5 seconds, laterally stretched at 2.8 times, and annealed at 220° C. for 10 seconds. As a result, because of poor elongation balance and low adhesive strength after forming, the formability and impact resistance were low.

In Experimental Example 5, PET of Experimental Example 4 was longitudinally stretched at 111° C. at a ratio of 3.3 times, preheated at 115° C. for 3 seconds, laterally stretched at 3.3 times, and annealed at 170° C. As a result, due to a large face orientation coefficient and low adhesive strength after forming, the lamination property, formability and impact resistance were low.

In Experimental Example 6, PET having a large diethylene glycol content and high molecular weight was longitudinally stretched at 107° C. at a ratio of 3.5 times, preheated at 115° C. for 3 seconds, laterally stretched at 118° C. at a ratio of 3.5 times, and annealed at 170° C. As a result, the face orientation coefficient and amorphous Young's modulus were large and the lamination property became especially poor.

In Experimental Example 7, longitudinal stretching at 108° C. at a ratio of 3.0 times, preheating at 115° C. for 5 seconds, lateral stretching at 2.9 times, and annealing at 180° C. for 10 seconds were effected. As a result, because of poor elongation balance, high amorphous Young's modulus, and low adhesive strength after elongation, the formability and impact resistance were low.

In Experimental Example 8, PET having an even higher crystallization rate was longitudinally stretched at 108° C. at a ratio of 3.1 times, preheated at 115° C. for 5 seconds, laterally stretched at a ratio of 3.05 times, and annealed at 183° C. for 10 seconds. As a result, because of the high crystallization rate of the polymer, the impact resistance after annealing was lower than that achieved in Experimental Example 7.

In Experimental Example 9, longitudinal stretching at 108° C. at a ratio of 3.4 times, preheating at 115° C. for 5 seconds, lateral stretching at 118° C. a ratio of 3.2 times, and annealing at 170° C. were effected. As a result, because of poor elongation balance, a high face orientation coefficient and low adhesive strength after forming, the lamination property, formability and impact resistance were low.

Experimental Examples 10 to 15 used composite films and utilized different polyesters, film forming conditions, laminate composition and lamination conditions. The physical properties of the films are shown in Tables 4 and 5, and the results of the evaluations are shown in Table 8. All the films exhibited high adhesive strength and improved properties overall.

In Experimental Example 10, PET having an intrinsic viscosity of 1.0 was laminated, and longitudinal stretching at 108° C. at a ratio of 3.0 times, preheating at 118° C. for 3 seconds, lateral stretching at 3.0 times, and annealing at 190° C. were effected to obtain a film.

In Experimental Example 11, longitudinal stretching at 108° C. at a ratio of 2.9 times, preheating at 118° C. for 3 seconds, lateral stretching at 118° C. at 2.9 times, and annealing at 190° C. were effected to obtain a film, and the film was then coated with an organic solvent prepared by mixing a polyamidedicarboxylic acid modified epoxy resin, phenolformaldehyde resin and hardening catalyst at a ratio by weight of 50:49:1. The process of coating was accomplished through the use of a coater.

In Experimental Example 12, the film obtained in Experimental Example 11 was coated with an aqueous solution containing a mixture consisting of a polyester-urethane resin and methylolated melamine at a ratio by weight of 95:5 and 10 wt % of isopropanol, after film formation including a corona treatment subsequent to longitudinal stretching.

In Experimental Example 13, a laminated polyester containing 0.1 wt % of an antioxidant was longitudinally stretched at 108° C. at a ratio of 2.9 times, preheated at 118° C. for 3 seconds, laterally stretched at 118° C. at 2.9 times, annealed at 185° C., and furthermore, corona-treated in a carbonic acid gas-air mixed atmosphere on the side to be laminated on the metallic sheet at 40 in E value.

In Experimental Example 14, a laminated polyester containing 0.1 wt % of an antioxidant was longitudinally stretched at 108° C. at a ratio of 2.9 times, preheated at 118° C. for 3 seconds, laterally stretched at 118° C. at 2.85 times, annealed at 185° C., and furthermore, corona-treated in a carbonic acid gas-air mixed atmosphere on the side to be laminated on the metallic sheet at 40 in E value.

COMPARATIVE EXPERIMENTAL EXAMPLES 15 to 20

The physical properties of the films are shown in Tables 6 and 7, and the results are shown in Table 8.

COMPARATIVE EXPERIMENTAL EXAMPLE 15

The film shown in Table 6 was obtained as in Experimental Example 4, except that polyethylene terephthalate copolymerized with 15 mol % of isophthalic acid was used as the polyester, the longitudinal preheating and stretching temperatures were 95° C., the longitudinal stretching ratio was 3.2 times, the lateral preheating and stretching temperatures were 115° C., the lateral stretching ratio was 3.3 times, and the annealing temperature was 160° C. The results are shown in Table 8. Since the ethylene terephthalate component content in the polyester was too low, the taste property and impact resistance were very poor.

COMPARATIVE EXPERIMENTAL EXAMPLE 6

The film shown in Table 6 was obtained as in Comparative Experimental Example 5, except that the polyester used and the film forming conditions were changed (longitudinal preheating and stretching temperatures were 95° C.; longitudinal stretching ratio was 3.3 times; lateral preheating and stretching temperatures were 115° C.; lateral stretching ratio was 3.1 times; annealing temperature was 165° C.). The results are shown in Table 8. Since the ethylene terephthalate component content in the polyester was low and since the elongation balance was poor, the formability, impact resistance and taste property were poor.

COMPARATIVE EXPERIMENTAL EXAMPLES 7 and 8

Films were obtained as in Experimental Example 16, except that polyethylene terephthalate was annealed at 235° C. for 15 seconds and that the stretching ratio was 3.1 or 3.4 times. Since neither the elongation, face orientation coefficient nor amorphous Young's modulus conformed to the present invention, all the properties were poor.

COMPARATIVE EXPERIMENT EXAMPLE 19

A film was obtained as in Experimental Example 16 except that polyethylene terephthalate copolymerized with 7 mol % of isophthalic acid was used. Since the ethylene terephthalate component content was low and since the face orientation coefficient and amorphous Young's modulus were large, the lamination property, formability, impact resistance and taste property were poor.

COMPARATIVE EXPERIMENTAL EXAMPLE 20

A film was obtained as in Comparative Experimental Example 5 except that polyethylene terephthalate copolymerized with 10 mol % of sebacic acid was used as the polyester, the stretching temperature was 70° C. and the annealing temperature was 175° C. Since the ethylene terephthalate component content in the polyester was low and since the face orientation coefficient was large, the lamination property, formability, impact resistance and taste property were poor.

TABLE 1

|  | Experimental example 1 | Experimental example 2 | Experimental example 3 |
|---|---|---|---|
| Polyester |  |  |  |
| Polyester | PET | PET | PET |
| Ethylene terephthalate component (mol %) | 97 | 97 | 98 |
| Tm (° C.) | 254 | 254 | 256 |
| ΔTcg (° C.) | 82 | 82 | 68 |
| DEG (mol %) | 3 | 3 | 2 |
| Intrinsic viscosity | 0.71 | 0.71 | 0.63 |
| Material of grains | Silica, Silica | Silica, Silica | Silica |
| Average grain size ($\mu$m) | 0.2, 0.8 | 0.2, 0.8 | 0.5 |
| Content (wt %) | 0.3, 0.05 | 0.3, 0.05 | 0.2 |
| Properties of film |  |  |  |
| Thickness ($\mu$m) | 25 | 25 | 22 |
| (SMD + STD)/2 (%) | 212 | 182 | 170 |
| \|SMD − STD\| (%) | 30 | 20 | 65 |
| Density (g/cm$^3$) | 1.387 | 1.399 | 1.395 |
| Face orientation coefficient (−) | 0.118 | 0.134 | 0.123 |
| Amorphous Young's modulus (kg/mm$^2$) | 182 | 175 | 190 |
| Intrinsic viscosity | 0.68 | 0.68 | 0.61 |
| Relaxation time |  |  |  |
| 134 (ppm) | 211 | 220 | 205 |
| 164 (ppm) | 348 | 386 | 355 |
| Grain size (nm) | 3.6 | 5.3 | 4.5 |
| Surface roughness |  |  |  |
| Ra ($\mu$m) | 0.012 | 0.016 | 0.010 |
| Rt ($\mu$m) | 0.165 | 0.240 | 0.162 |
| Wet tension (dyne/cm) | 48 | 41 | 42 |
| Adhesive strength |  |  |  |
| Sheet (g/15 mm) | 1500 | 1500 | 1400 |
| After forming (g/15 mm) | 420 | 380 | 230 |

TABLE 2

|  | Experimental example 4 | Experimental example 5 | Experimental example 6 |
|---|---|---|---|
| Polyester |  |  |  |
| Polyester | PET | PET | PET |
| Ethylene terephthalate component (mol %) | 98 | 98 | 96 |
| Tm (° C.) | 256 | 256 | 250 |
| ΔTcg (° C.) | 65 | 65 | 82 |
| DEG (mol %) | 2 | 2 | 4 |
| Intrinsic viscosity | 0.63 | 0.63 | 0.8 |
| Material of grains | Crosslinked polystyrene | Crosslinked polystyrene | Crosslinked polystyrene |
| Average grain size (μm) | 0.3 | 0.3 | 0.3 |
| Content (wt %) | 0.2 | 0.2 | 0.2 |
| Properties of film |  |  |  |
| Thickness (μm) | 25 | 25 | 25 |
| (SMD + STD)/2 (%) | 169 | 176 | 150 |
| \|SMD − STD\| (%) | 63 | 20 | 25 |
| Density (g/cm$^3$) | 1.398 | 1.383 | 1.383 |
| Face orientation coefficient (−) | 0.129 | 0.132 | 0.145 |
| Amorphous Young's modulus (kg/mm$^2$) | 185 | 215 | 258 |
| Intrinsic viscosity | 0.61 | 0.61 | 0.76 |
| Relaxation time |  |  |  |
| 134 (ppm) | 198 | 180 | 185 |
| 164 (ppm) | 353 | 305 | 298 |
| Grain size (nm) | 5.2 | 2.9 | 2.9 |
| Surface roughness |  |  |  |
| Ra (μm) | 0.019 | 0.020 | 0.018 |
| Rt (μm) | 0.275 | 0.320 | 0.260 |
| Wet tension (dyne/cm) | 42 | 42 | 42 |
| Adhesive strength |  |  |  |
| Sheet (g/15 mm) | 900 | 920 | 1200 |
| After forming (g/15 mm) | 200 | 220 | 330 |

TABLE 3

|  | Experimental example 7 | Experimental example 8 | Experimental example 9 |
|---|---|---|---|
| Polyester |  |  |  |
| Polyester | PET | PET | PET |
| Ethylene terephthalate component (mol %) | 98 | 98.5 | 98 |
| Tm (° C.) | 256 | 256 | 256 |
| ΔTcg (° C.) | 65 | 59 | 65 |
| DEG (mol %) | 2 | 1.5 | 2 |
| Intrinsic viscosity | 0.68 | 0.67 | 0.68 |
| Material of grains | Calcium carbonate | Calcium carbonate | Calcium carbonate |
| Average grain size (μm) | 0.8 | 0.8 | 0.8 |
| Content (wt %) | 0.2 | 0.2 | 0.2 |
| Properties of film |  |  |  |
| Thickness (μm) | 25 | 25 | 20 |
| (SMD + STD)/2 (%) | 165 | 169 | 172 |
| \|SMD − STD\| (%) | 62 | 61 | 63 |
| Density (g/cm$^3$) | 1.386 | 1.388 | 1.383 |
| Face orientation coefficient (−) | 0.126 | 0.129 | 0.132 |
| Amorphous Young's modulus (kg/mm$^2$) | 218 | 222 | 218 |
| Intrinsic viscosity | 0.65 | 0.64 | 0.65 |
| Relaxation time |  |  |  |
| 134 (ppm) | 202 | 188 | 189 |
| 164 (ppm) | 347 | 310 | 309 |
| Grain size (nm) | 3.9 | 4.1 | 2.9 |
| Surface roughness |  |  |  |
| Ra (μm) | 0.025 | 0.023 | 0.025 |
| Rt (μm) | 0.335 | 0.331 | 0.375 |
| Wet tension (dyne/cm) | 42 | 42 | 42 |
| Adhesive strength |  |  |  |
| Sheet (g/15 mm) | 1150 | 950 | 1100 |
| After forming (g/15 mm) | 240 | 200 | 230 |

TABLE 4

|  | Experimental example 10 | Experimental example 11 | Experimental example 12 |
|---|---|---|---|
| Polyester |  |  |  |
| Polyester | PET | PET | PET |
| Ethylene terephthalate component (mol %) | 98 | 97 | 97 |
| Tm (° C.) | 256 | 254 | 254 |
| ΔTcg (° C.) | 70 | 82 | 82 |
| DEG (mol %) | 2 | 3 | 3 |
| Intrinsic viscosity | 0.71 | 0.71 | 0.71 |
| Material of grains | Silica, Silica | Silica, Silica | Silica, Silica |
| Average grain size (μm) | 0.2, 0.8 | 0.2, 0.8 | 0.2, 0.8 |
| Content (wt %) | 0.3, 0.05 | 0.3, 0.05 | 0.3, 0.05 |

TABLE 4-continued

| | Experimental example 10 | Experimental example 11 | Experimental example 12 |
|---|---|---|---|
| Laminated polymer | | | |
| Polymer and features | PET Intrinsic viscosity 1.0 (Ge: 30 ppm) DEG: 4.5 mol % Thickness: 10 μm | Polyamidedicarboxylic acid modified epoxy resin + Phenolformaldehyde resin + Hardening catalyst Thickness: 2 μm | Polyesterurethane resin + Melamine compound Thickness: 0.1 μm |
| Properties of film | | | |
| Total thickness (μm) | 25 | 25 | 25 |
| (SMD + STD)/2 (%) | 175 | 212 | 212 |
| \|SMD − STD\| (%) | 20 | 30 | 30 |
| Density (g/cm$^3$) | 1.387 | 1.391 | 1.391 |
| Face orientation coefficient (−) | 0.125 | 0.118 | 0.118 |
| Amorphous Young's modulus (kg/mm$^2$) | 195 | 182 | 182 |
| Intrinsic viscosity | 0.77 | 0.68 | 0.68 |
| Relaxation time | | | |
| 134 (ppm) | 220 | 211 | 211 |
| 164 (ppm) | 358 | 348 | 348 |
| Grain size (nm) | 4.0 | 4.1 | 4.1 |
| Surface roughness | | | |
| Ra (μm) | 0.013 | 0.012 | 0.012 |
| Rt (μm) | 0.170 | 0.165 | 0.165 |
| Wet tension (dyne/cm) | 43 | −(42) | −(42) |
| Adhesive strength | | | |
| Sheet (g/15 mm) | 1400 | 1200 | 1200 |
| After forming (g/15 mm) | 530 | 400 | 350 |

TABLE 5

| | Experimental example 13 | Experimental example 14 |
|---|---|---|
| Polyester | | |
| Polyester | PET | PET |
| Ethylene terephthalate component (mol %) | 98 | 97 |
| Tm (° C.) | 256 | 254 |
| ΔTcg (° C.) | 70 | 82 |
| DEG (mol %) | 2 | 3 |
| Intrinsic viscosity | 0.71 | 0.68 |
| Material of grains | Silica, Silica | Silica, Silica |
| Average grain size (μm) | 0.2, 0.8 | 0.2, 0.8 |
| Content (wt %) | 0.3, 0.05 | 0.3, 0.05 |
| Laminated polymer | | |
| Polymer and features | PET Intrinsic viscosity 1.0 (Ge: 30 ppm) DEG: 4.5 mol % Thickness: 5 μm Antioxidant | PET Intrinsic viscosity 0.8 (Ge: 30 ppm) DEG: 3.5 mol % Thickness: 5 μm Antioxidant |
| Properties of film | | |
| Total thickness (μm) | 25 | 25 |
| (SMD + STD)/2 (%) | 185 | 198 |
| \|SMD − STD\| (%) | 10 | 15 |
| Density (g/cm$^3$) | 1.387 | 1.388 |
| Face orientation coefficient (−) | 0.121 | 0.118 |
| Amorphous Young's modulus (kg/mm$^2$) | 190 | 187 |
| Intrinsic viscosity | 0.72 | 0.68 |
| Relaxation time | | |
| 134 (ppm) | 217 | 221 |
| 164 (ppm) | 359 | 349 |
| Grain size (nm) | 3.8 | 3.6 |
| Surface roughness | | |
| Ra (μm) | 0.012 | 0.012 |
| Rt (μm) | 0.190 | 0.169 |
| Wet tension (dyne/cm) | 53 | 54 |
| Adhesive strength | | |
| Sheet (g/15 mm) | 1400 | 1300 |
| After forming (g/15 mm) | 820 | 680 |

TABLE 6

| | Experimental Comparative example 15 | Experimental Comparative example 16 | Experimental Comparative example 17 |
|---|---|---|---|
| Polyester | | | |
| Polyester | PET/1 | PET/1 | PET |
| Ethylene terephthalate component (mol %) | 83.5 | 83.5 | 98 |
| Tm (° C.) | 222 | 222 | 256 |
| ΔTcg (° C.) | 115 | 115 | 58 |
| DEG (mol %) | 1.5 | 1.5 | 2 |
| Intrinsic viscosity | 0.65 | 0.65 | 0.63 |
| Material of grains | Silica | Silica | Silica |
| Average grain size (μm) | 0.8 | 0.8 | 0.5 |
| Content (wt %) | 0.1 | 0.1 | 0.2 |
| Properties of film | | | |
| Thickness (μm) | 25 | 25 | 20 |
| (SMD + STD)/2 (%) | 195 | 215 | 138 |

TABLE 6-continued

|  | Experimental Comparative example 15 | Experimental Comparative example 16 | Experimental Comparative example 17 |
|---|---|---|---|
| \|SMD − STD\| (%) | 50 | 65 | 35 |
| Density (g/cm³) | 1.370 | 1.375 | 1.409 |
| Face orientation coefficient (−) | 0.128 | 0.125 | 0.155 |
| Amorphous Young's modulus (kg/mm²) | 230 | 225 | 225 |
| Intrinsic viscosity | 0.62 | 0.62 | 0.61 |
| Grain size (nm) | 2.5 | 2.6 | 6.3 |
| Surface roughness |  |  |  |
| Ra (μm) | 0.022 | 0.022 | 0.012 |
| Rt (μm) | 0.375 | 0.340 | 0.190 |

TABLE 7

|  | Experimental Comparative example 18 | Experimental Comparative example 19 | Experimental Comparative example 20 |
|---|---|---|---|
| Polyester |  |  |  |
| Polyester | PET | PET/1 | PET/S |
| Ethylene terephthalate component (mol %) | 98 | 81.5 | 88 |
| Tm (° C.) | 256 | 239 | 230 |
| ΔTcg (° C.) | 58 | 95 | 90 |
| DEG (mol %) | 2 | 1.5 | 2 |
| Intrinsic viscosity | 0.63 | 0.65 | 0.66 |
| Material of grains | Silica | Silica | Silica |
| Average grain size (μm) | 0.8 | 0.8 | 0.5 |
| Content (wt %) | 0.1 | 0.1 | 0.2 |
| Properties of film |  |  |  |
| Thickness (μm) | 20 | 25 | 20 |
| (SMD + STD)/2 (%) | 148 | 180 | 168 |
| \|SMD − STD\| (%) | 65 | 30 | 45 |
| Density (g/cm³) | 1.409 | 1.373 | 1.384 |
| Face orientation coefficient (−) | 0.145 | 0.135 | 0.145 |
| Amorphous Young's modulus (kg/mm²) | 238 | 226 | 205 |
| Intrinsic viscosity | 0.61 | 0.62 | 0.63 |
| Grain size (nm) | 6.1 | 2.7 | 3.8 |
| Surface roughness |  |  |  |
| Ra (μm) | 0.012 | 0.023 | 0.013 |
| Rt (μm) | 0.190 | 0.352 | 0.198 |

TABLE 8

|  | Lamination property | Formability a | b | c | Impact resistance a | b | Taste property a (μg) | b (ppm) |
|---|---|---|---|---|---|---|---|---|
| Experimental example 1 | A | A | A | B | A | A | 14 | 1.3 |
| Experimental example 2 | B | A | A | B | A | A | 14 | 1.3 |
| Experimental example 3 | A | B | B | B | A | B | 16 | 1.5 |
| Experimental example 4 | A | B | B | B | B | B | 16 | 1.5 |
| Experimental example 5 | B | B | B | B | B | B | 16 | 1.5 |
| Experimental example 6 | B | B | B | B | B | A | 12 | 1.2 |
| Experimental example 7 | A | B | B | B | B | B | 14 | 1.4 |
| Experimental example 8 | B | B | B | B | B | B | 14 | 1.4 |
| Experimental example 9 | B | B | B | B | B | B | 14 | 1.4 |
| Experimental example 10 | A | A | A | A | A | A | 10 | 1.1 |
| Experimental example 11 | A | A | A | A | A | A | 12 | 1.2 |
| Experimental example 12 | A | A | A | A | A | A | 13 | 1.3 |
| Experimental example 13 | A | A | A | A | A | A | 11 | 1.2 |
| Experimental example 14 | A | A | A | A | A | A | 13 | 1.3 |
| Comparative Expermental example 15 | B | B | B | C | B | D | 35 | 2.7 |
| Comparative Expermental example 16 | B | B | C | C | B | D | 35 | 1.6 |
| Comparative Expermental example 17 | D | C | D | D | B | C | 18 | 1.6 |
| Comparative Expermental example 18 | D | C | D | D | B | C | 17 | 2.6 |
| Comparative Expermental example 19 | C | B | C | C | C | D | 33 | 1.6 |
| Comparative Expermental example 20 | D | C | C | D | C | D | 85 | 3.7 |

The biaxially oriented polyester film of the present invention exhibits excellent formability when formed into containers. The film of the invention also possesses excellent taste properties, especially regarding taste properties after boiling, and is suitable for use in metallic cans produced by forming.

Although this invention has been described with reference to specific elements and method steps, equivalent elements and method steps may be substituted without departing from the spirit and scope of the invention defined in the appended claims.

What is claimed is:

1. A biaxially oriented polyester-containing film for forming into containers capable of lining the interior and/or exterior of a container,
    said polyester-containing film comprising 93 mol % or more of ethylene terephthalate,
    said polyester-containing film having a breaking elongation in the machine direction, S MD, and a breaking elongation in the transverse direction, S TD, which satisfy the following relationships (1) and (2):

$$\text{about } 140\% \leq (S\ MD + S\ TD)/2 \leq \text{about } 300\% \tag{1},$$

$$|S\ MD - S\ TD| < 60\% \tag{2}.$$

2. A biaxially oriented polyester-containing film for forming into containers and capable of lining the interior and/or exterior of a container,
    said polyester-containing film comprising 95 mol % or more of ethylene terephthalate,
    said polyester-containing film having a face orientation coefficient in the range of about 0.01 to less than about 0.13.

3. A biaxially oriented polyester-containing film for forming into containers and capable of lining the interior and/or exterior of a container, said polyester-containing film comprising 95 mol % or more of ethylene terephthalate, said polyester-containing film having an amorphous Young's modulus of about 120 to about 220 kg/mm².

4. A biaxially oriented polyester-containing film according to claim 1, wherein said polyester has a face orientation coefficient in the range of about 0.01 to less than about 0.13.

5. A biaxially oriented polyester-containing film for forming into containers and capable of lining the interior and/or exterior of a container, said polyester-containing film comprising 93 mol % or more of ethylene terephthalate, said polyester-containing film having a face orientation coefficient in the range of about 0.01 to less than 0.13, wherein said polyester has an amorphous Young's modulus of about 120 to about 220 kg/mm².

6. A biaxially oriented polyester-containing film according to claim 1, wherein said polyester has an amorphous Young's modulus of about 120 to about 220 kg/mm2.

7. A biaxially oriented polyester-containing film according to any one of claims 1 or 3 to 6, wherein the relaxation time T1ρ of 1,4 benzene ring carbon atoms in said film as determined by structural analysis through solid high resolution NMR is 150 msec or more.

8. A biaxially oriented polyester-containing film according to any one of claims 1 or 3 to 6, wherein the relaxation time T1ρ of carbonyl carbon atom in said film as determined by structural analysis through solid high resolution NMR is 250 msec or more.

9. A biaxially oriented polyester-containing film according to any one of claims 1 or 3 to 6, further comprising grains in which the grain size of the (100) face as measured by X-ray diffractometry is 6 nm or less.

10. A biaxially oriented polyester-containing film according to any one of claims 1 or 3 to 6, said polyester-containing film further comprising opposing surfaces and at least two layers, said layers including first and second surface layers defining said opposing surfaces of said film, wherein the difference in intrinsic viscosity between said first and second surface layers is about 0.01 to about 0.5.

11. A biaxially oriented polyester-containing film to be formed into containers, according to any one of claims 1 or 3 to 6, wherein the thermal crystallization parameter ΔTcg of the polyester satisfies the following relation:

about 60(° C.)≦ΔTcg≦about 150(° C.), where ΔTcg=Tc−Tg,

Tc represents the heated crystallization peak temperature in DSC (° C.), and

Tg represents the glass transition temperature in DSC (° C.).

12. A biaxially oriented polyester-containing film according to any one of claims 1 or 3 to 6, further comprising an adhesive about 0.01 to about 3 μm thick laminated to said polyester-containing film.

13. A biaxially oriented polyester-containing film according to any one of claims 1 or 3 to 6, wherein said film is laminated onto a container, said container being made from a metallic sheet.

14. A biaxially oriented polyester-containing film according to claim 13, wherein said metallic sheet is drawn in one step or several steps.

15. A biaxially oriented polyester-containing film container according to claim 14, wherein the adhesive strength of said film to said drawn metallic sheet is 250 g/15 mm or more.

16. A biaxially oriented polyester-containing film according to claim 13, wherein the adhesive strength of said film to said metallic sheet is 1 kg/15 mm or more.

17. A biaxially oriented polyester-containing film to be formed into containers, according to any one of claims 1, 3 and 6, wherein the optical density is about 0.3 to about 1.0.

18. A biaxially oriented polyester-containing film according to claim 17, wherein the glossiness on at least one surface of said film is 50% or more.

19. A biaxially oriented polyester-containing film for forming into containers and capable of lining the interior and/or exterior of a container, said polyester-containing film comprising 95 mol % or more of ethylene terephthalate, said polyester-containing film having a breaking elongation in the machine direction, S MD, and a breaking elongation in the transverse direction, S TD, which satisfy the following relationships (1) and (2):

about 140%≦(S MD+STD)/2≦about 300%     (1),

|S MD−STD|<60%     (2), said polyester-containing film having a face orientation coefficient in the range of about 0.01 to less than about 0;13, and said polyester-containing film having an amorphous Young's modulus of about 120 to about 220 kg/mm².

20. A biaxially oriented polyester-containing film for forming into containers and capable of lining the interior and/or exterior of a container, said polyester-containing film comprising 93 mol % or more of ethylene terephthalate, said polyester-containing film having a face orientation coefficient in the range of about 0.01 to less than 0.13, wherein the relaxation time T1ρ of 1,4 benzene ring carbon atoms in said film as determined by structural analysis through solid high resolution NMR is 150 msec or more.

21. A biaxially oriented polyester-containing film for forming into containers and capable of lining the interior and/or exterior of a container, said polyester-containing film comprising 93 mol % or more of ethylene terephthalate, said polyester-containing film having a face orientation coefficient in the range of about 0.01 to less than 0.13, wherein the relaxation time T1ρ of carbonyl carbon atom in said film as determined by structural analysis through solid high resolution NMR is 250 msec or more.

22. A biaxially oriented polyester-containing film for forming into containers and capable of lining the interior and/or exterior of a container, said polyester-containing film comprising 93 mol % or more of ethylene terephthalate, said polyester-containing film having a face orientation coefficient in the range of about 0.01 to less than 0.13, said polyester-containing film further comprising grains in which the grain size of the (100) face as measured by x-ray diffractometry is 6 nm or less.

23. A biaxially oriented polyester-containing film for forming into containers and capable of lining the interior and/or exterior of a container, said polyester-containing film comprising 93 mol % or more of ethylene terephthalate, said polyester-containing film having a face orientation coefficient in the range of about 0.01 to less than 0.13, said polyester-containing film further comprising opposing surfaces and at least two layers, said layers including first and second surface layers defining said opposing surfaces of said film, wherein the difference in intrinsic viscosity between said first and second surface layers is about 0.01 to about 0.5.

24. A biaxially oriented polyester-containing film to be formed into containers, said polyester-containing film comprising 93 mol % or more of ethylene terephthalate, said polyester-containing film having a face orientation coefficient in the range of about 0.01 to less than 0.13, wherein the thermal crystallization parameter ΔTcg of the polyester satisfies the following relation:

about 60(° C.)≦ΔTcg<about 150(° C.), where ΔTcg=Tc−Tg,

Tc represents the heated crystallization peak temperature in DSC (° C.), and Tg represents the glass transition temperature in DSC (° C.).

25. A biaxially oriented polyester-containing film for forming into containers and capable of lining the interior and/or exterior of a container, said polyester-containing film comprising 95 mol % or more of ethylene terephthalate, said polyester-containing film having a face orientation coefficient in the range of about 0.01 to less than 0.13, said polyester-containing film further comprising an adhesive about 0.01 to about 3 μm thick laminated to said polyester-containing film.

26. A biaxially oriented polyester-containing film for forming into containers and capable of lining the interior and/or exterior of a container, said polyester-containing film comprising 95 mol % or more of ethylene terephthalate, said polyester-containing film having a face orientation coefficient in the range of about 0.01 to less than 0.13, wherein said film is laminated onto a container, said container being made from a metallic sheet.

27. A biaxially oriented polyester-containing film according to claim 26, wherein said metallic sheet is drawn in one or several steps.

28. A biaxially oriented polyester-containing film container according to claim 27 wherein the adhesive strength of said film to said drawn metallic sheet is 250 g/15 mm or more.

29. A biaxially oriented polyester-containing film according to claim 26, wherein the adhesive strength of said film to said metallic sheet is 1 kg/15 mm or more.

* * * * *

UNITED STATES PATENT AND TRADEMARK OFFICE
CERTIFICATE OF CORRECTION

PATENT NO. : 6,610,378 B1  Page 1 of 1
APPLICATION NO. : 08/724352
DATED : August 26, 2003
INVENTOR(S) : Kimura et al.

It is certified that error appears in the above-identified patent and that said Letters Patent is hereby corrected as shown below:

Column 17,
Line 57, change "EXAMPLE 6" to -- EXAMPLE 16 --.
Line 60, change "Example 5" to -- Example 15 --.

Column 18,
Line 5, change "EXAMPLES 7 and 8" to -- EXAMPLES 17 and 18 --.
Lines 6 and 15, change "Experimental Example 16" to -- Comparative Experimental Example 15 --.
Line 25, change "Example 5" to -- Example 15 --.

Column 22,
Table 6, rows 1 and 2, change "Experimental Comparative" to -- Comparative Experimental --.

Column 23,
Table 6-continued, rows 1 and 2, change "Experimental Comparative" to -- Comparative Experimental --.
Table 7, rows 1 and 2, change "Experimental Comparative" to -- Comparative Experimental --.

Signed and Sealed this

Twenty-seventh Day of June, 2006

JON W. DUDAS
*Director of the United States Patent and Trademark Office*